United States Patent
Stevanovic et al.

(10) Patent No.: US 8,621,872 B2
(45) Date of Patent: *Jan. 7, 2014

(54) METHOD AND DEVICE FOR UTILISING BIOMASS

(75) Inventors: Dragan Stevanovic, Sulzbach-Rosenberg (DE); Sven Johannssen, Regensburg (DE); Reinhard Pritscher, Ergolding (DE)

(73) Assignee: Krones AG (DE)

( * ) Notice: Subject to any disclaimer, the term of this patent is extended or adjusted under 35 U.S.C. 154(b) by 16 days.

This patent is subject to a terminal disclaimer.

(21) Appl. No.: 13/390,655

(22) PCT Filed: Aug. 12, 2010

(86) PCT No.: PCT/EP2010/061753
§ 371 (c)(1),
(2), (4) Date: Feb. 15, 2012

(87) PCT Pub. No.: WO2011/020767
PCT Pub. Date: Feb. 4, 2011

(65) Prior Publication Data
US 2012/0137702 A1    Jun. 7, 2012

(30) Foreign Application Priority Data
Aug. 21, 2009  (DE) .................. 10 2009 038 323

(51) Int. Cl.
*F02C 6/18* (2006.01)
(52) U.S. Cl.
USPC ............................................. 60/781
(58) Field of Classification Search
USPC ........................ 60/39.12, 780, 781
See application file for complete search history.

(56) References Cited

U.S. PATENT DOCUMENTS

| 4,058,974 A | 11/1977 | Pfenninger ................ 60/39.12 |
| 4,667,467 A * | 5/1987 | Archer et al. ................ 60/781 |
| 5,069,685 A | 12/1991 | Bissett et al. .................. 48/77 |
| 5,643,354 A | 7/1997 | Agrawal et al. .............. 75/490 |

(Continued)

FOREIGN PATENT DOCUMENTS

| DE | 3931582 | 4/1991 | ............... F02C 7/08 |
| DE | 4236619 | 5/1994 | ............. F28D 17/00 |

(Continued)

OTHER PUBLICATIONS

International Search Report issued in corresponding PCT application No. PCT/EP2010/061753 dated Dec. 1, 2010 (6 pgs).

(Continued)

*Primary Examiner* — Phutthiwat Wongwian
(74) *Attorney, Agent, or Firm* — Hayes Soloway P.C.

(57) ABSTRACT

A method and device for converting thermal energy from carbonaceous raw materials into mechanical work is provided. The device includes at least one first and one second device for storing and releasing thermal energy connected at least intermittently alternatingly in a turbine branch having a gas turbine connected downstream. The method includes the steps of: a) combusting a gas in a gas burner; b) passing the smoke gases arising in the gas burner through a device for storing thermal energy; and c) feeding the hot air released by at least one device into the gas turbine, wherein the gasification of the carbonaceous raw materials takes place in a gasifier in a first step and the product gas is fed into the gas burner connected downstream of the gasifier.

15 Claims, 3 Drawing Sheets

(56) References Cited

U.S. PATENT DOCUMENTS

| | | | |
|---|---|---|---|
| 5,706,645 A * | 1/1998 | Mollot et al. | 60/776 |
| 6,032,456 A | 3/2000 | Easom et al. | 60/39.2 |
| 6,247,301 B1 * | 6/2001 | Brannstrom et al. | 60/39.12 |
| 6,430,915 B1 * | 8/2002 | Wiant et al. | 60/39.12 |
| 6,799,425 B2 * | 10/2004 | Emmel et al. | 60/659 |
| 2003/0106266 A1 | 6/2003 | Bryan et al. | 48/197 |
| 2004/0088980 A1 * | 5/2004 | Emmel et al. | 60/645 |
| 2011/0035990 A1 * | 2/2011 | Kammerloher et al. | 44/311 |

FOREIGN PATENT DOCUMENTS

| | | | |
|---|---|---|---|
| DE | 4342165 | 5/1995 | C10B 53/02 |
| DE | 10039246 | 2/2002 | F02C 3/20 |
| DE | 10227074 | 1/2004 | C10J 3/54 |
| DE | 202004017725 | 2/2005 | F01K 27/00 |
| EP | 0132452 | 2/1985 | F02C 7/10 |
| EP | 0620909 | 5/1996 | F28D 17/00 |
| GB | 1502887 | 3/1978 | F02C 7/08 |
| WO | WO 9324704 | 12/1993 | D21C 11/12 |

OTHER PUBLICATIONS

Markus Ising: "Vergasung fester Biomasse-Bereits Stand der Technik?" May 16, 2000 pp. 1-19 (20 pgs).

Official Action issued in corresponding U.S. Appl. No. 13/390,487 dated May 3, 2013 16 pgs.

International Search Report issued in PCT/EP2010/061754 (with translation) dated Oct. 28, 2010 (6pgs).

* cited by examiner

METHOD AND DEVICE FOR UTILISING BIOMASS

FIELD OF THE INVENTION

The invention relates to a method for the conversion of thermal energy from carbonaceous raw materials into mechanical work, and to an apparatus for converting thermal energy into mechanical work. The invention will be described with reference to biomass, but it is noted that the method and apparatus according to the invention can also be used for other carbonaceous products.

BACKGROUND OF THE INVENTION

DE 100 39 246 C2 relates to a method for converting thermal energy into mechanical work, wherein a first and a second means for storing thermal energy are connected alternately into a turbine branch. In this case the formation of dust in the flue gases, which for example has to be removed by means of a cyclone, has proven to be disadvantageous.

DE 102 27 074 A1 describes a method for the gasification biomass and an installation therefor. In this case the substances are burned in a combustion chamber, which is separated from a gasification reactor in a gas-tight manner, and the thermal energy from the combustion chamber is introduced into the gasification reactor.

DE 198 36 428 C2 discloses a method and apparatuses for the gasification of biomass, in particular of mechanical pulp. In this case packed-bed degassing takes place in a first gasification stage at temperatures up to 600° C., and fluidised-bed degassing takes place in a downstream, second gasification stage at temperatures between 800° C. and 1000° C.

SUMMARY OF THE INVENTION

The object of the present invention is therefore to provide a method and an apparatus for converting thermal energy from combustion and gasification of carbonaceous raw materials into mechanical work, which method and apparatus allow a high level of efficiency and a high level of efficacy with the avoidance of dust in the flue gases. Furthermore, a method is to be provided which feeds energies produced, in particular waste heat, back into the process.

A fundamental point of the invention lies in the fact that a method for converting thermal energy from carbonaceous raw materials into mechanical work using at least a first and a second device for storing thermal energy, these devices being connected alternately, at least temporarily, into a turbine branch with a downstream gas turbine, comprises the following steps:
a) combustion of a gas in a gas burner,
b) conveyance of the flue gases produced in the gas burner through a device for storing thermal energy, and
c) introduction of the hot air released by a device for storing thermal energy into the gas turbine or the expander thereof,
wherein, in a first step, the carbonaceous raw materials are gasified in a gasifier and the product gas is fed to a gas burner downstream of the gasifier. The use of a gasifier before the step of combustion in the gas burner in particular allows a considerable reduction of dust, in particular fine dust in the flue gases. Also, a reduced proportion of dust allows the use of higher temperatures during the gas combustion process. In addition, a greater level of efficacy in the case of power production can be obtained. The reduction of fine dust also has a positive effect on the service life of the gas turbine.

The term "downstream" is understood in particular to mean a downstream arrangement in relation to the respective gases to be processed. The gas burner is preferably directly downstream of the gasifier. The device for storing thermal energy is preferably also suitable for releasing the stored thermal energy, for example in the form of hot air. It is thus proposed in accordance with the invention to obtain the product gas for the gas burner from an additional gasification process so that, in this respect, no additional dust particles are formed, in contrast to the prior art. Connection into the turbine branch is thus understood in particular to mean that the hot air obtained in the means for storing thermal energy is preferably released to the gas turbine.

In particular, bulk material generators can be used as devices for storing thermal energy, as was described for example in EP 0 620 909 B1 or DE 42 36 619 C2.

Heated water vapour or air or a mixture of water vapour and air is preferably introduced into the gasifier as gasification medium and used for gasification. Together with the water vapour, a further gaseous medium is advantageously fed to the gasifier as combustion gas. For example, hot air, oxygen, air enriched with oxygen and the like are considered as combustion gas.

A packed-bed counterflow gasifier is preferably used as a gasifier. In principle, different types of gasifier according to the prior art can be used. However, the specific advantage of a counterflow packed-bed gasifier lies in the fact that individual zones form inside this reactor, and different temperatures prevail and different processes can thus take place in these zones. The different temperatures are caused by the fact that the respective processes are highly endothermic and the heat only comes from below.

At least one further heat exchanger arranged downstream of a compressor of the gas turbine is advantageously provided and cools fed hot air, at least in part, and feeds this in the form of cold air to the first and/or second device for storing thermal energy. An increase in efficiency of the stored energy is thus to be ensured on the one hand. On the other hand, the temperature of the flue gas can also be reduced by the cooling of the air.

Furthermore, an injection of water is preferably provided downstream of the compressor of the gas turbine.

At least one valve-like means for disconnection of the turbine branch is preferably provided between the compressor and a pressure reducer of the gas turbine. The valve-like means is used for emergency shutdown and is preferably arranged in a bypass between a line feeding to the pressure reducer and a line conducting away from the compressor of the gas turbine.

In a preferred embodiment, the waste heat from at least one of the processes following gasification is used for wet steam production. In particular, this concerns the supplying of the waste heat to at least one heat exchanger downstream of the gas turbine, water being heated by said heat exchanger. A heat exchanger for heating air is also provided.

Gas which dispenses waste heat is preferably any gas which exits from the gas turbine and is still at a very high temperature.

Before it is fed to the gasifier, the wet steam is produced by means of a heat exchanger arranged downstream of the gas turbine.

Cooling is preferably instigated by means of at least one heat exchanger, and the thermal energy obtained by the cooling process is separated as useful heat. This contributes further to environmental compatibility and to the increase in efficiency of the method.

Depressurised hot air from the turbine is preferably fed again to the gas burner so as to further increase the efficiency of the method. For example, combustion air which leaves the gas turbine can thus be fed back to the gas burner via a corresponding feed line.

In a further preferred method, depressurised hot air from the gas turbine is used for energy production by means of a further steam turbine. This additional steam turbine could be incorporated in a separate water circuit, and the water in this circuit could be evaporated and heated by a heat exchanger. Once exited from the steam turbine, the steam is condensed and compressed in the liquid state by a pump before it circulates again through the heat exchanger.

In accordance with the invention, a gas burner for burning a fuel, at least a first and a second device for storing thermal energy, these devices being connectable alternately, at least temporarily, into a turbine branch with a downstream gas turbine or expander thereof, and at least one connection line, which feeds flue gases produced in the gas burner to the devices for storing thermal energy, are provided for the apparatus for converting thermal energy into mechanical work, wherein a gasifier for producing the fuel is arranged upstream of the gas burner.

The apparatus advantageously comprises a compressor for compressing the air fed to the devices for storing thermal energy, wherein this compressor is particularly preferably a component of the gas turbine.

It is also proposed with regard to the apparatus that the flue gases are formed during the combustion of a product gas which is in turn produced in a gasifier. A temporary alternate connection of the devices for storing thermal energy is understood to mean that one of the two devices is supplied with flue gas, at least temporarily, within selected periods, whereas the other device releases hot air to the gas turbine. Furthermore, it would also be possible for a multiplicity of devices for storing thermal energy to be provided which operate in a time-delayed manner, at least in part. For example, one of these devices for storing energy can thus be supplied with flue gas, whereas one or more of the other devices release (s) the hot air. With regard also to the release of hot air, the devices for storing thermal energy also operate in a time-delayed manner, at least in part.

Means for cooling a gas are preferably provided downstream of the turbine branch.

These means for cooling the gas are preferably heat exchangers which, as mentioned above, can simultaneously heat air so as to thus produce hot air which can be fed to the gasifier. Furthermore, wet steam can be produced by these means and can likewise be fed to the gasifier.

Furthermore, a means for the alternate connection of at least a first device and at least a second device into the turbine branch is preferably provided.

For example, these means for alternate connection may be a multiplicity of controllable valves which each allow an alternate feed of flue gas into the means for storing thermal energy and an alternate release of heated air to the gas turbine. Furthermore, temperature sensors may be provided which each measure the temperatures at appropriate points of the devices for storing thermal energy and switch the corresponding valves in response to these measurements so that an optimal supply of hot air to the gas turbines is enabled at any moment in time and, furthermore, an efficient reloading of the means for storing thermal energy is also enabled.

Furthermore, the gas turbine or a part thereof preferably also acts as a compressor so as to compress fed air and so as to, in turn, feed cold air to be heated to the devices for storing thermal energy. At least one heat exchanger is particularly preferably arranged downstream of the gas turbine.

At least one and preferably a plurality of heat exchangers for separating thermal energy is/are preferably connected between the gas turbine and the gasifier.

There is preferably no direct gas connection between the gas turbine and the gasifier. However, thermal energy of the gases released by the gas turbine is transferred by means of the heat exchanger to other media, such as the wet steam and the hot air, and these media are in turn fed to the gasifier, as mentioned above. Furthermore, a connection line is preferably provided between the gas turbine and the gas burner so that combustion air exiting from the gas turbine can in turn be fed to the gas burner so as to make the combustion process in the gas burner even more efficient.

In a further advantageous embodiment, a further steam turbine is arranged downstream of the gas turbine. As a result of this downstream turbine, the hot air from the first gas turbine can again be used for power production. The current efficiency can thus be further improved.

BRIEF DESCRIPTION OF THE DRAWINGS

Advantages and conveniences are to be inferred from the following description in conjunction with the drawing, in which.

DETAILED DESCRIPTION OF THE INVENTION

Figure 1:
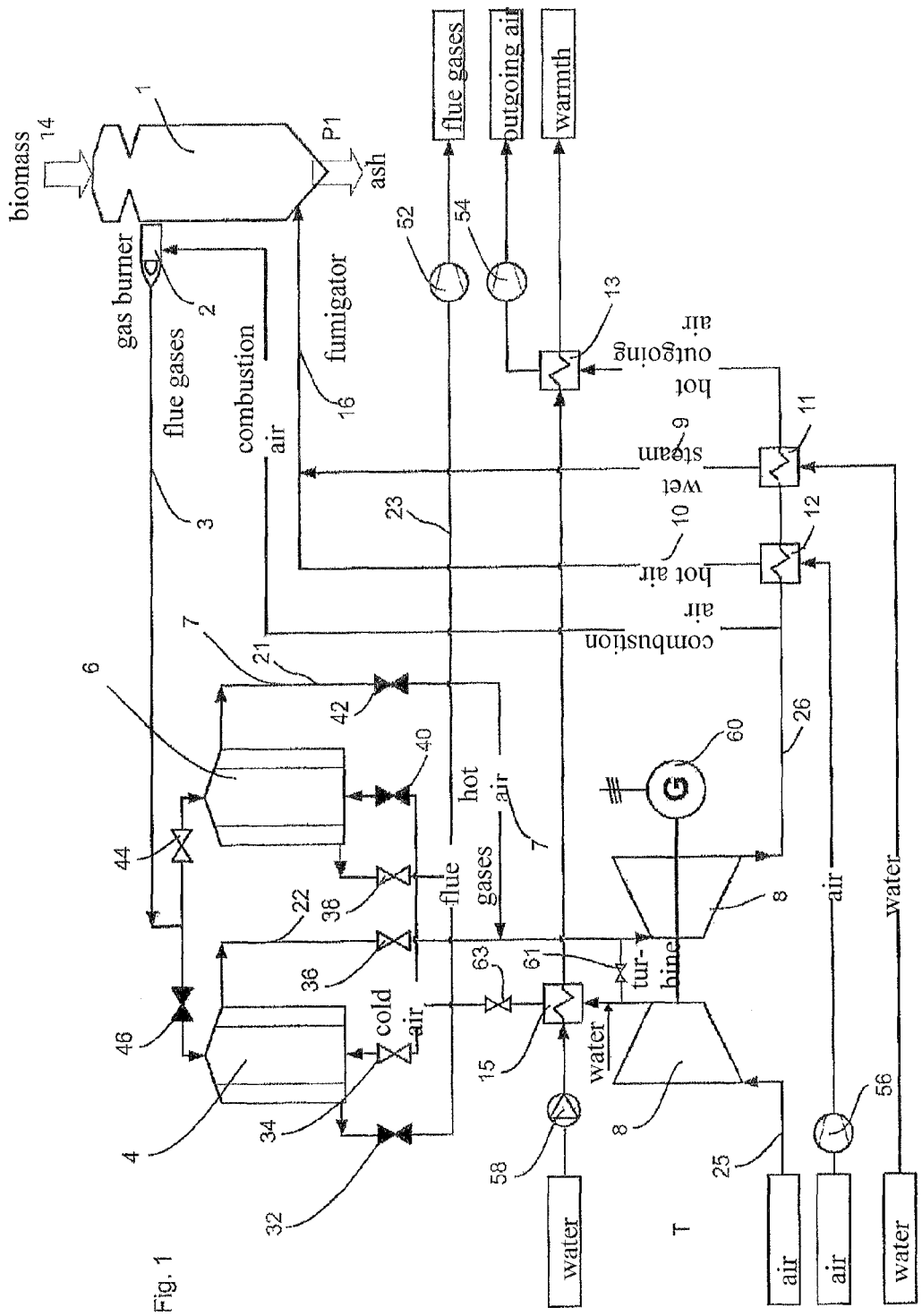
FIG. 1 shows a first flow diagram.

FIG. 1 shows a schematic flow diagram of the use of an apparatus according to the invention for converting thermal energy from carbonaceous raw materials into mechanical work. Reference sign 1 denotes a packed-bed counterflow reactor. The raw material 14 is introduced into the reactor 1 from above and the gasification medium (for example air) is introduced from below along a feed line 16. In this way, the gasification medium and the product gas circulate the reaction chamber in a direction opposite that of the fuel flow. The ash formed in the gasifier 1 is removed downwardly, that is to say in the direction of the arrow P1.

The product gas reaches the gas burner 2 and is burned. The flue gases formed in the gas burner 2 are then fed through a connecting line 3 into a first 4 or second 6 bulk material regenerator, and the hot air 7 released by the bulk material regenerators 4, 6 is fed via a line 21 to a gas turbine 8. A generator G is arranged on the gas turbine 8 in the turbine branch T. Reference sign 23 denotes a discharge line for removing the flue gas formed in the means 4, 6 for storing thermal energy.

A line 22 leads from the first regenerator 4 to the gas turbine 8. The waste air exiting from the gas turbine 8 is fed via a further line 26 to the gas burner 2 as pre-heated combustion air. The first 4 and second regenerator 6 can be operated alternately in the turbine branch T or in a "pre-heating branch" by means of an apparatus (not shown). Reference sign 60 denotes a generator which is coupled to the Reference signs 32, 34, 36, 38, 40, 42, 44 and 46 each refer to controllable valves which control the feed of the flue gas to the bulk material regenerators 4, 6 (valves 44 and 46) and the release of the hot air from bulk material regenerators 4, 6 to the gas turbine 8 (valves 35 and 42), the release of flue gas (valves 32 and 38) and also, conversely, the feed of cold air (valves 34 and 40) to the bulk material regenerators 4, 6. The valves sketched in black are in the open state, and the valves which are merely bordered are in the closed state. Reference signs 52, 54 and 56 each relate to compressors or fans to respectively compress or convey air (reference sign 56), flue gas (reference sign 52) and waste air (reference sign 54).

Furthermore, air is fed via the line 25 to the gas turbine 8 and is fed via a further heat exchanger 15 so as to be fed into bulk material regenerators 4 and 6 as cold air.

By using the gasifier 1, it is possible to dispense with a costly dedusting of the flue gases 3.

Reference sign 61 denotes a valve-like means, for disconnection of the turbine branch, between the compressor and a pressure reducer of the gas turbine. An injection of water is possible between the turbine and the heat exchanger 15. A further valve 63 is provided in this branch.

Heat exchangers 11, 12 and 13 are connected in a line 26 leading from the gas turbine 8 so as to feed both air and water, in a heated state, as gasification media to the packed-bed counterflow reactor 1. Also, cooling is instigated by means of at least one heat exchanger 13, and the thermal energy obtained by the cooling process is separated as useful heat.

Figure 2:
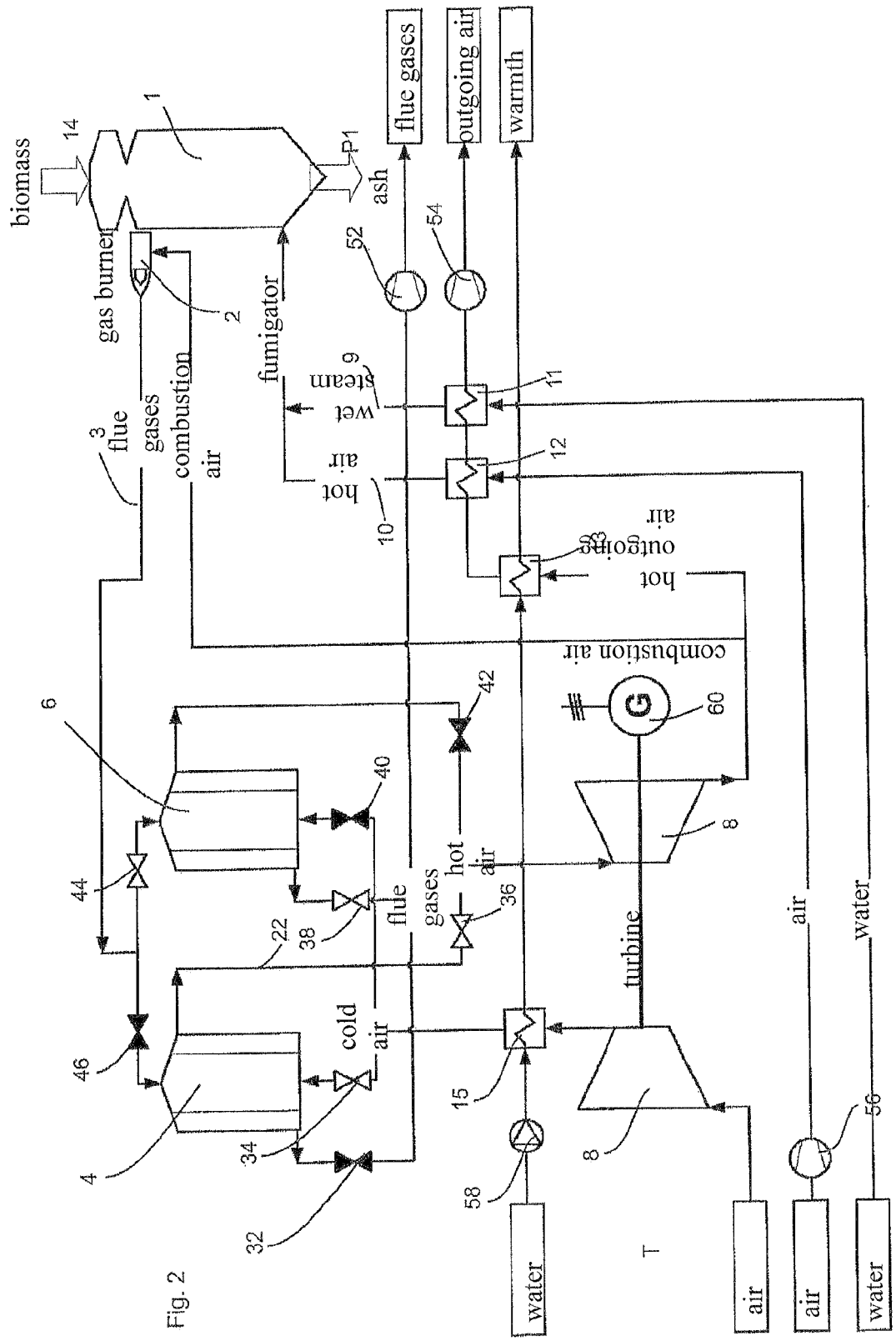
FIG. 2 shows a second flow diagram.

In the embodiment shown in FIG. 2 the heat exchanger 13 is arranged directly downstream of the turbine branch T. By means of this apparatus it is possible to utilise the separated heat (for production of warm water) at a relatively high temperature level. The heat exchangers 11, 12 for heating air and water as gasification media are arranged, downstream.

The order of the heat exchangers is thus altered in the two embodiments shown. Whereas, in the embodiment shown in FIG. 1, the first heat exchanger 12, which receives the combustion air having the highest temperature, is used for the production of hot air, the next heat exchanger 11 is used for the production of wet steam, and the last heat exchanger 13 is used for the production of heat, in the embodiment shown in FIG. 2 heat is produced using the hottest air, and then hot air and wet steam. Furthermore, it would also be possible to swap the order of the two heat exchangers 12 and 11. Reference sign 58 in the two figures relates to a pump for conveying water. Reference sign 10 in the figures relates to the combustion gas and reference sign 9 denotes the wet steam.

Figure 3:
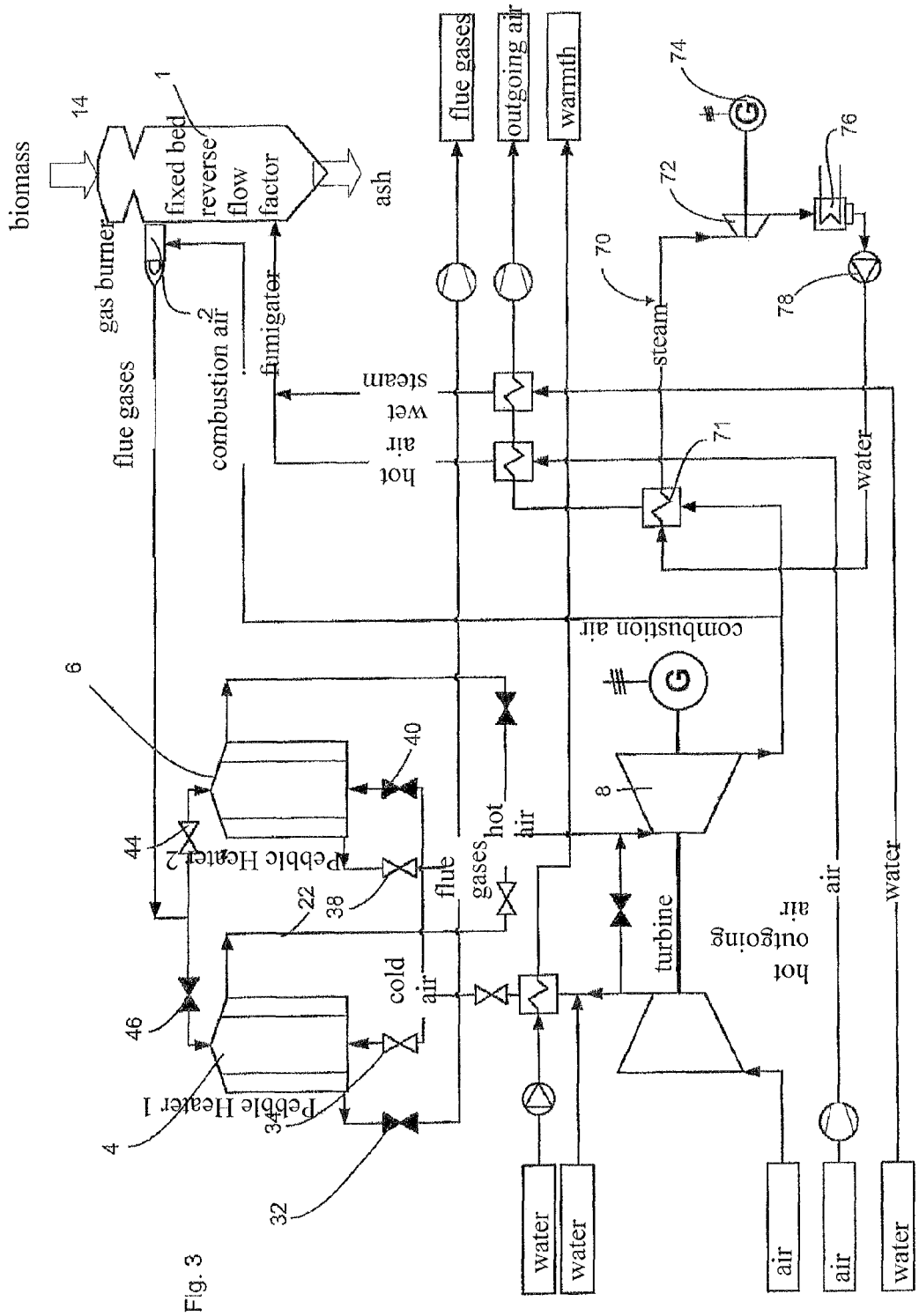
FIG. 3 shows a third flow diagram.

FIG. 3 shows a further embodiment of the present invention. In this embodiment a further circuit 70 is provided which is arranged downstream of the gas turbine 8. More precisely, the hot air from the gas turbine 8 is fed through a heat exchanger 71 which is integrated into this circuit 70. Water in the circuit 70 is heated by the heat exchanger and is fed to a steam turbine 72, which in turn drives a generator 74, Reference sign 78 relates to a pump, and reference sign 76 relates to a condenser. As a result of this approach, the current efficiency of the system can be increased further.

All features disclosed in the application documents are claimed as being essential to the invention insofar as they are novel over the prior art, either individually or in combination.

LIST OF REFERENCE SIGNS

1 gasifier
2 gas burner
3 flue gases, connection line
4 first device for storing and releasing thermal energy
6 second device for storing and releasing thermal energy
7 hot air, connection line
8 gas turbine
9 wet steam
10 hot air
11, 12
13, 15 heat exchangers
14 carbonaceous raw material
16 feed line for gasification medium
21, 22 feed line to the gas turbine
25 line
26 feed line to heat exchangers
32, 34, 36,
38, 40, 42,
44, 46 controllable valves
52, 54, 56 fan
58, 78 pump
60 generator
61 valve
63 valve
70 circuit
71 heat exchanger
72 steam turbine
74 generator
76 condenser
P1 directional arrow
T turbine branch

The invention claimed is:

1. A method for converting thermal energy from carbonaceous raw materials into mechanical work using at least a first device and a second device for storing and releasing thermal energy, the first device and the second device being connected to a turbine line of a downstream gas turbine, said method comprising the following steps:
   a) combustion of a gas in a gas burner,
   b) conveyance of the flue gases formed in the gas burner through at least one of the first device and the second device for storing thermal energy,
   c) compression of the air fed to the first device and/or the second device for storing thermal energy, and
   d) introduction of compressed hot air released by at least one of the first device and the second device into the gas turbine,
   wherein
   in a first step, the carbonaceous raw materials are gasified in a gasifier,
   the product gas is fed to the gas burner downstream of the gasifier, and
   there is no direct gas connection between the gas turbine and the gasifier.

2. The method according to claim 1,
   wherein
   heated water vapour and/or air is introduced into the gasifier and is used for gasification.

3. The method according to claim 2,
   including feeding a gaseous medium as a combustion gas to the gasifier together with the water vapour.

4. The method according to claim 1,
   wherein
   a packed-bed counterflow gasifier is used as a gasifier.

5. The method according to claim 1,
   including using waste heat from gasification of the carbonaceous raw materials in the gasifier to produce wet steam.

6. The method according to claim 1,
   including producing wet steam in a heat exchanger arranged downstream of the gas turbine, and feeding the wet steam to the gasifer.

7. The method according to claim 1,
   wherein
   cooling is instigated by at least one heat exchanger, and separating thermal energy obtained by the cooling as useful heat.

8. The method according to claim 1, including using depressurised hot air from the gas turbine to the gas burner.

9. The method according to claim 1, including using depressurised hot air from the gas turbine for energy production by a steam turbine.

10. An apparatus for converting thermal energy into mechanical work, comprising a gas burner for burning a fuel; at least a first device and a second device for storing thermal energy, the first device and the second device being connected to a turbine line of a downstream gas turbine, a compressor for compressing air fed to the devices for storing thermal energy, and at least one connection line, which feeds flue gases formed in the gas burner to the devices for storing thermal energy;

wherein a gasifier for converting the combustion gas is arranged upstream of the gas burner, and there is no direct gas connection between the gas turbine and the gasifier.

11. The apparatus according to claim 10, wherein at least one heater exchanger for cooling a gas is provided downstream of the turbine branch (T).

12. The apparatus according to claim 10, wherein a connector for the alternate connection of at least a first device for storing thermal energy and at least a second device for storing thermal energy is provided in the turbine branch (T).

13. The apparatus according to claim 10, wherein at least one heat exchanger is arranged downstream of the gas turbine.

14. The apparatus according to claim 10, wherein at least one heat exchanger for separating thermal energy is connected between the gas turbine and the gasifier.

15. The apparatus according to claim 10, wherein a steam turbine is arranged downstream of the gas turbine.

* * * * *

UNITED STATES PATENT AND TRADEMARK OFFICE
CERTIFICATE OF CORRECTION

| | | |
|---|---|---|
| PATENT NO. | : 8,621,872 B2 | Page 1 of 1 |
| APPLICATION NO. | : 13/390655 | |
| DATED | : January 7, 2014 | |
| INVENTOR(S) | : Stevanovic et al. | |

It is certified that error appears in the above-identified patent and that said Letters Patent is hereby corrected as shown below:

On the Title Page, item [87]

PCT Pub. Date, cipher 87, "Feb. 4, 2011" should be --February 24, 2011--.

Signed and Sealed this
Nineteenth Day of August, 2014

Michelle K. Lee
*Deputy Director of the United States Patent and Trademark Office*